United States Patent
Holly et al.

(10) Patent No.: US 8,054,212 B1
(45) Date of Patent: Nov. 8, 2011

(54) MULTI-BAND RECEIVER USING HARMONIC SYNCHRONOUS DETECTION

(75) Inventors: Sandor Holly, Woodland Hills, CA (US); Nicholas Koumvakalis, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 474 days.

(21) Appl. No.: 12/412,919

(22) Filed: Mar. 27, 2009

(51) Int. Cl.
G01S 7/38 (2006.01)

(52) U.S. Cl. .................. 342/13; 342/14; 342/59

(58) Field of Classification Search ............ 342/13, 342/14, 52, 59, 90, 98–103, 118, 126, 175; 455/1
See application file for complete search history.

(56) References Cited

U.S. PATENT DOCUMENTS

| | | | |
|---|---|---|---|
| 3,745,575 A | 7/1973 | Kikuchi | |
| 5,668,342 A | 9/1997 | Discher | |
| 5,900,833 A | 5/1999 | Sunlin et al. | |
| 6,057,765 A | 5/2000 | Jones et al. | |
| 6,094,157 A | 7/2000 | Cowdrick | |
| 6,163,259 A | 12/2000 | Barsumian et al. | |
| 6,501,414 B2 | 12/2002 | Arndt et al. | |
| 6,522,285 B2 | 2/2003 | Stolarczyk et al. | |
| 6,765,527 B2 * | 7/2004 | Jablonski et al. | 342/193 |
| 6,864,825 B2 | 3/2005 | Holly | |
| 6,897,777 B2 | 5/2005 | Holmes et al. | |
| 6,943,742 B2 | 9/2005 | Holly | |
| 6,950,076 B2 | 9/2005 | Holly | |
| 6,999,041 B2 | 2/2006 | Holly | |
| 7,009,575 B2 | 3/2006 | Holly et al. | |
| 7,130,624 B1 | 10/2006 | Jackson et al. | |
| 7,142,147 B2 * | 11/2006 | Holly | 342/13 |
| 7,142,174 B2 | 11/2006 | Holly | |
| 7,190,302 B2 | 3/2007 | Biggs et al. | |
| 7,473,898 B2 | 1/2009 | Holly et al. | |
| 7,528,762 B2 | 5/2009 | Cerwin | |
| 2002/0011947 A1 | 1/2002 | Stolarczyk et al. | |
| 2002/0111720 A1 | 8/2002 | Holst et al. | |
| 2002/0175849 A1 | 11/2002 | Arndt et al. | |
| 2003/0028899 A1 | 2/2003 | MacInnis | |

(Continued)

FOREIGN PATENT DOCUMENTS

WO    0077614 A    12/2000

(Continued)

OTHER PUBLICATIONS

U.S. Appl. No. 12/504,293, filed Jul. 16, 2009, Holly et al.

(Continued)

*Primary Examiner* — David Mis

(74) *Attorney, Agent, or Firm* — Yee & Associates, P.C.

(57) ABSTRACT

An apparatus comprises a transmitter system, a receiver system, and a processor unit. The transmitter system transmits first and second collimated beams having a first and second frequency. The receiver system monitors for a fundamental difference frequency signal having a difference frequency equal to a difference between the first and second frequency and a number of harmonics of the fundamental difference frequency signal. These signals are generated by an object having non-linear electrical characteristics in response to the collimated beams. The processor unit is connected to the transmitter system and the receiver system. The processor unit controls the transmitter and receiver systems to change at least one of the first and second frequencies through a range of frequencies and detect a range of fundamental difference frequency signals and the number of harmonics of the fundamental difference frequency signal in response to transmitting the collimated beams using the range of frequencies.

20 Claims, 7 Drawing Sheets

U.S. PATENT DOCUMENTS

| | | | |
|---|---|---|---|
| 2003/0041236 A1 | 2/2003 | Nestoryak | |
| 2005/0064922 A1 | 3/2005 | Owens et al. | |
| 2005/0200550 A1 | 9/2005 | Vetrovec et al. | |
| 2006/0082488 A1 | 4/2006 | Keller | |
| 2006/0206587 A1 | 9/2006 | Fabbrocino | |
| 2007/0013577 A1* | 1/2007 | Schnitzer et al. | 342/90 |
| 2007/0024489 A1 | 2/2007 | Cerwin | |
| 2007/0046791 A1 | 3/2007 | Wang et al. | |
| 2008/0092518 A1 | 4/2008 | Winkler et al. | |
| 2008/0127171 A1 | 5/2008 | Tarassov | |
| 2008/0127175 A1 | 5/2008 | Naranjo et al. | |
| 2008/0295090 A1 | 11/2008 | Bestle et al. | |
| 2009/0040093 A1 | 2/2009 | Holly et al. | |
| 2009/0198393 A1 | 8/2009 | Sims, III et al. | |
| 2009/0198712 A1 | 8/2009 | Sims, III et al. | |
| 2010/0001899 A1* | 1/2010 | Holly et al. | 342/175 |

FOREIGN PATENT DOCUMENTS

WO  2006110991 A  10/2006

OTHER PUBLICATIONS

U.S. Appl. No. 12/481,941, filed Jun. 10, 2009, Burns et al.

U.S. Appl. No. 11/758,785, filed Jun. 6, 2007, Holly et al.

Wilson et al., "Improvised Explosive Devices (IEDs) in Iraq and Afghanistan: Effects and Countermeasures", CRS Report for Congress, updated Nov. 21, 2007, pp. 1-6.

U.S. Appl. No. 11/758,787, filed Jun. 6, 2007, Holly et al.

U.S. Appl. No. 12/167,753, filed Mar. 7, 2008, Holly et al.

U.S. Appl. No. 11/393,386, filed Mar. 30, 2006, Schultz et al.

* cited by examiner

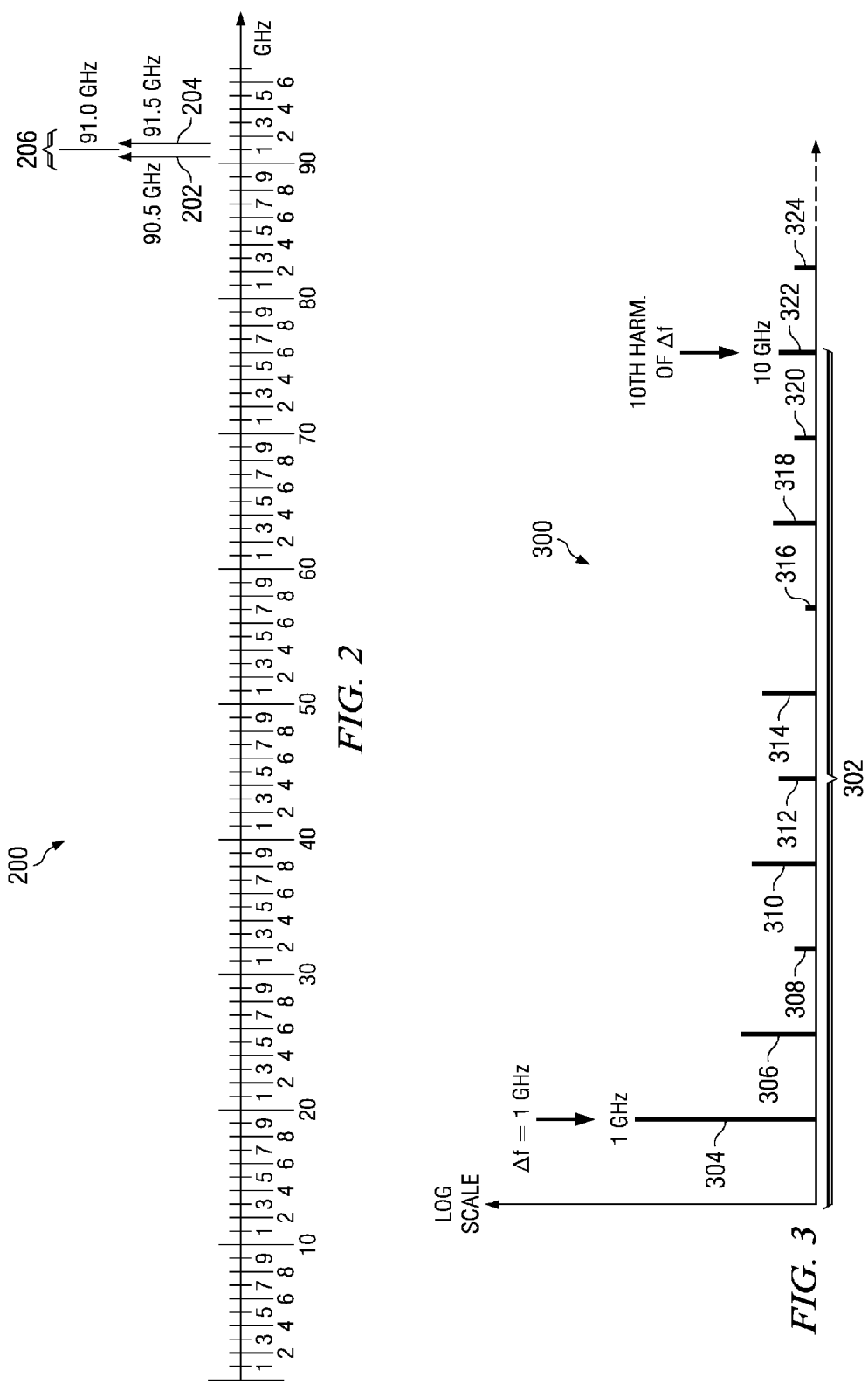

MULTI-BAND RECEIVER USING HARMONIC SYNCHRONOUS DETECTION

GOVERNMENT LICENSE RIGHTS

This invention was made with Government support under contract number N00174-08-C-0031 awarded by the United States Navy. The Government has certain rights in this invention.

BACKGROUND INFORMATION

1. Field

The present disclosure relates generally to detecting objects. More particularly, the present disclosure relates to a method and apparatus for detecting objects using electromagnetic radiation.

2. Background

Improvised explosive devices are bombs constructed and deployed in manners not normally used by conventional military organizations. Improvised explosive devices may be used by terrorists, guerillas, and other forces. Improvised explosive devices may be placed on a roadway. In some cases, an improvised explosive device may be carried in a car, a truck, or by a person.

An improvised explosive device may have a power supply, a trigger, a detonator, a main charge, and a container. The improvised explosive device also may include shrapnel-generating objects, such as nails or ball bearings.

The trigger is a mechanism to set off the device. The trigger may be, for example, a radio signal, a tripwire, a timer, or a firing button. Improvised explosive devices have employed cell phones, cordless phones, garage door openers, and/or some other type of electronic device.

To counter improvised explosive devices, jamming systems have been employed to prevent setting off improvised explosive devices. Although jamming systems may be used to prevent setting off improvised explosive devices, these types of jamming systems do not detect the presence of or disarm the device.

Additionally, various technologies have been used to identify improvised electronic devices. These technologies involve using radar, x-rays, and pre-detonators. For example, some detection systems include a stoichiometric diagnostic device. This type of device is capable of deciphering chemical signatures of unknown substances through metal or other barriers. An example of another detection device is a laser-induced breakdown spectroscopy system. This type of system is capable of detecting traces of explosives used for improvised explosive devices from distances such as 30 meters. Some improvised explosive devices, however, may not emit chemicals or have detectable amounts of explosives.

Therefore, it would be advantageous to have a method and apparatus that takes into account one or more of the issues discussed above, as well as possibly other issues.

SUMMARY

In one advantageous embodiment, an apparatus comprises a transmitter system, a receiver system, and a processor unit. The transmitter system is capable of transmitting a first collimated beam having a first frequency and a second collimated beam having a second frequency. The receiver system is capable of monitoring for a fundamental difference frequency signal having a difference frequency equal to a difference between the first frequency and the second frequency and a number of harmonics of the fundamental difference frequency signal, each of which is a harmonic of the fundamental difference frequency signal. The fundamental difference frequency signal and the number of harmonics of the fundamental difference frequency signal are generated by an object having non-linear electrical characteristics in response to receiving the first collimated beam and the second collimated beam. The processor unit is connected to the transmitter system and the receiver system. The processor unit is capable of controlling operation of the transmitter system and the receiver system to change at least one of the first frequency and the second frequency through a range of frequencies and to detect a range of fundamental frequency signals and a range of the number of harmonics of the fundamental difference frequency signals in response to the transmitter system transmitting the first collimated beam and the second collimated beam using the range of frequencies.

In another advantageous embodiment, an apparatus comprises a transmitter system, a receiver system, and a processor unit. The transmitter system is capable of transmitting a plurality of electromagnetic signals having a first frequency and a second frequency. The receiver system is capable of monitoring for a fundamental difference frequency signal having a difference frequency equal to a difference between the first frequency and the second frequency and a number of harmonics of the fundamental difference frequency signals, each of which is a harmonic of the fundamental difference frequency signal. The fundamental difference frequency signal and the number of harmonics of the fundamental difference frequency signal are generated by an object having non-linear electrical characteristics in response to receiving the plurality of electronic signals having the first frequency and the second frequency. The processor unit is connected to the transmitter system and the receiver system. The processor unit is capable of controlling operation of the transmitter system and the receiver system to change at least one of the first frequency and the second frequency through a range of frequencies and to detect a range of fundamental difference frequency signals and a range of the number of harmonics of the fundamental difference frequency signals in response to the transmitter system transmitting the plurality of electromagnetic signals using the range of frequencies.

In still another advantageous embodiment, a method is presented for detecting objects. A first collimated beam having a first frequency and a second collimated beam having a second frequency is transmitted. At least one of the first frequency and the second frequency are changed through a range of frequencies. Monitoring is performed for a range of fundamental difference frequency signals and a range of a number of harmonics of the fundamental difference frequency signals, each of which is a harmonic of the range of fundamental difference frequency signals generated by an object having non-linear electrical characteristics in response to receiving the first collimated beam and the second collimated beam in which at least one of the first frequency and the second frequency is changed through the range of frequencies.

In yet another advantageous embodiment, a method is presented for detecting objects. A first collimated beam having a first selected frequency and a second collimated beam having a second selected frequency is transmitted at a known object having non-linear electrical characteristics. At least one of the first selected frequency and the second selected frequency is changed through a selected range of frequencies. An expected range of fundamental difference frequency signals and an expected range of a number of harmonics of the fundamental difference frequency signals, each of which is a harmonic of the expected range of fundamental difference frequency signals generated by the known object in response to receiving the first collimated beam and the second collimated beam using a range of frequencies are received to form a profile for the known object. The profile is stored.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 2 is a diagram illustrating a range of frequencies that may be used to transmit collimated beams in accordance with an advantageous embodiment;

FIG. 3 is a diagram illustrating difference frequency harmonics that may be obtained by transmitting a first collimated beam and a second collimated beam at an object in accordance with an advantageous embodiment;

DETAILED DESCRIPTION

The different advantageous embodiments recognize and take into account that currently available systems for countering improvised explosive devices may be unable to detect a presence of an improvised explosive device. For example, the different advantageous embodiments recognize and take into account that jamming systems may prevent an improvised explosive device from being detonated.

Detonation is prevented only while the jamming system is active and/or is located in a location around the improvised explosive device. Once the jamming system is moved or turned off, the improvised explosive device may still be used and pose danger and/or hazard to vehicles and/or personnel in the vicinity of the improvised explosive device.

Further, some currently used techniques may be able to detect a presence of an improvised explosive device but are unable to identify the particular type of device. The different advantageous embodiments recognize and take into account that knowing the type of device being used may aid in disarming or avoiding the device.

Thus, the different advantageous embodiments provide a method and apparatus for detecting objects. These objects may include, for example, improvised explosive devices or any other suitable type of object that has non-linear electrical characteristics. In some of the advantageous embodiments, an apparatus comprises a transmitter, a receiver system, and a processor unit. The transmitter system is capable of transmitting a first collimated beam having a first frequency and a second collimated beam having a second frequency.

The receiver system is capable of monitoring for a fundamental frequency having a frequency equal to a difference between the first frequency and the second frequency. Further, the receiver system also is capable of monitoring for a number of harmonic responses of the fundamental difference frequency signals, each of which is a harmonic of the fundamental difference frequency signal. These signals are generated by an object having non-linear electrical characteristics in response to receiving the first collimated beam and the second collimated beam.

The processor unit is capable of controlling the operation of the transmitter system to change at least one of the first frequency and the second frequency through a range of frequencies. The processor unit also is capable of operating the receiver system to detect a range of fundamental difference frequency signals and a range of the number of harmonics of the fundamental difference frequency signals. This response is used to detect the object. In detecting the object, a presence of the object may be detected and/or an identification of the object may be made. In some cases, the presence of the object may be known, but the identification of the object may be unknown.

Figure 1:
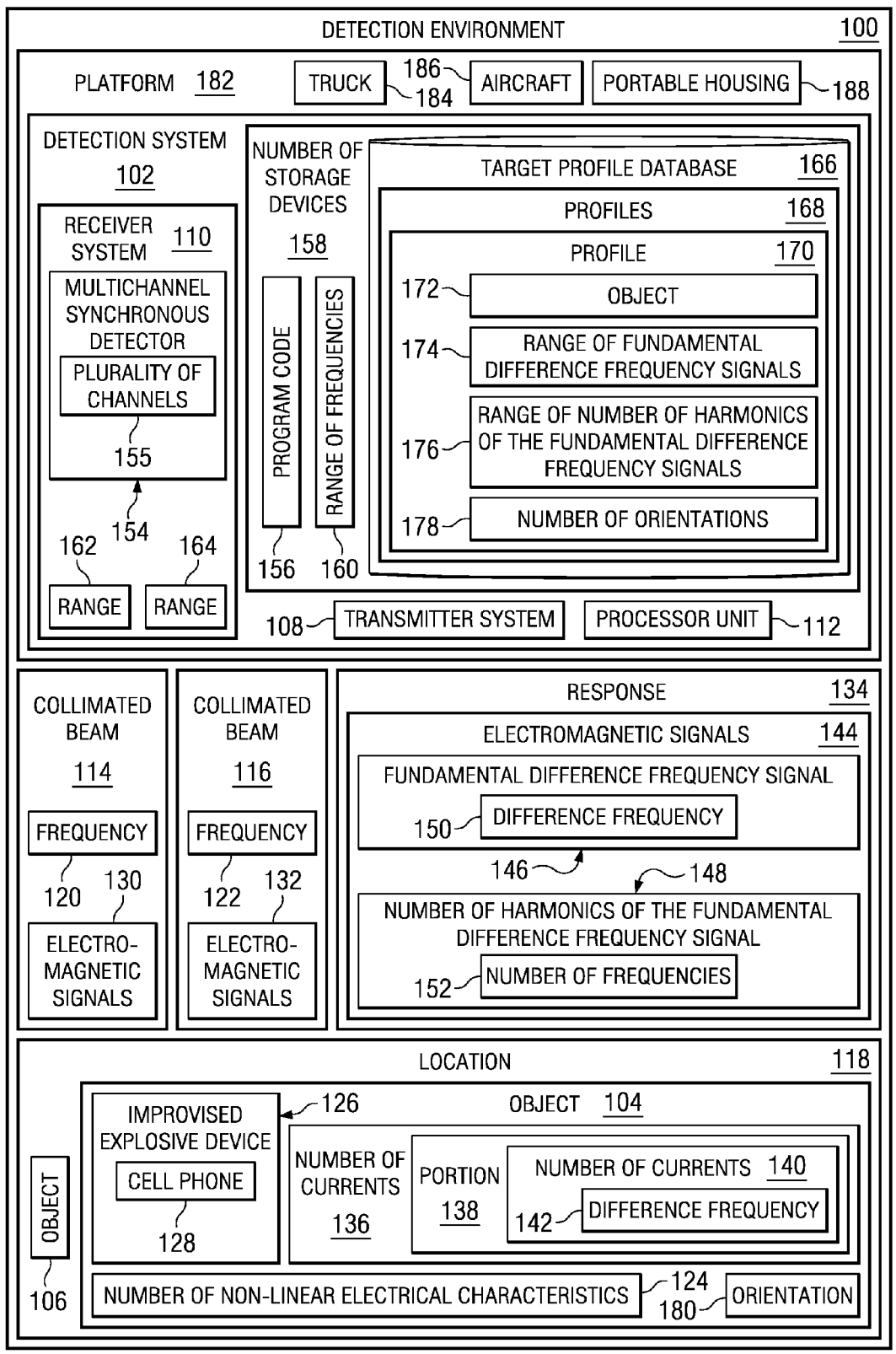
FIG. 1 is a diagram illustrating a detection environment in accordance with an advantageous embodiment.

With reference now to FIG. 1, a diagram illustrating a detection environment is depicted in accordance with an advantageous embodiment. In this illustrative example, detection environment 100 includes detection system 102. Detection system 102 may be used to identify object 104.

In these illustrative examples, non-linear radar technology is used by detection system 102 to detect object 104. In these illustrative examples, detecting object 104 comprises at least one of detecting a presence of object 104 and identifying object 104. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In the illustrative examples, object 104 may be detected by detection system 102, even if object 104 is hidden by object 106. Object 104 may be hidden behind object 106, located within object 106, or under object 106 in these examples. Object 106 may be, for example, without limitation, a box, fog, the ground, and/or some other object that may be used to obscure and/or hide object 104 from view. Of course, in some examples, object 104 may not be obscured by object 106.

In these illustrative examples, detection system 102 includes transmitter system 108, receiver system 110, and processor unit 112. Transmitter system 108 is capable of transmitting collimated beam 114 and collimated beam 116. A collimated beam is electromagnetic radiation in the form of rays that are substantially parallel. A collimated beam will spread more slowly as the electromagnetic radiation propagates as compared to electromagnetic radiation that has not been collimated. Collimated beam 114 and collimated beam 116 may have substantially the same intensities. Also, these beams also may have substantially parallel aligned polarizations at location 118.

Collimated beam 114 and collimated beam 116 are generated by transmitter system 108 in a manner such that collimated beam 114 and collimated beam 116 merge at location 118 for object 104.

Collimated beam 114 has frequency 120, while collimated beam 116 has frequency 122. Frequency 120 is different from frequency 122 in these illustrative examples.

In the depicted examples, object 104 has number of non-linear electrical characteristics 124. A number of, as used herein, when referring to items means one or more items. Electrical characteristics may include, for example, without limitation, conductive, capacitive, inductive, and/or other types of electrical characteristics.

For example, number of non-linear electrical characteristics 124 is one or more non-linear electrical characteristics. As another example, number of non-linear electrical characteristics 124 may be two different types of metals in layers in object 104. Number of non-linear electrical characteristics 124 may be, for example, without limitation, a corroded or oxidized portion of a surface of an object that has a different non-linear electrical characteristic from a non-corroded or non-oxidized portion of object 104. As yet another example, object 104 may include a number of electronic circuits with non-linear components. These non-linear components may be, for example, without limitation, diodes, transistors, and/or some other suitable components with non-linear electrical characteristics.

In these illustrative examples, object 104 may be an improvised explosive device 126 containing cell phone 128 as a trigger. Cell phone 128 contains components with number of non-linear electrical characteristics 124 in these illustrative examples. Cell phone 128 may contain non-linear components, such as diodes, transistors, and/or other suitable components.

The particular components located within cell phone 128 and/or their arrangement are used to identify cell phone 128 as a cell phone using detection system 102. Also, a particular model and type may be identified for cell phone 128 based on the non-linear components making up cell phone 128. Of course, object 104 may be any object containing number of non-linear electrical characteristics 124.

When electromagnetic signals 130 in collimated beam 114 and electromagnetic signals 132 in collimated beam 116 encounter object 104, response 134 is generated by a number of non-linear electrical characteristics 124 in object 104. Electromagnetic signals 130 and electromagnetic signals 132 cause number of currents 136 to be induced during the duration of electromagnetic signals 130 and electromagnetic signals 132 encountering object 104.

Portion 138 of number of currents 136 may be converted to and/or rectified into number of currents 140 that oscillate at difference frequency 142. Difference frequency 142 is a frequency that is the difference between frequency 120 and frequency 122 for electromagnetic signals 130 in collimated beam 114 and electromagnetic signals 132 in collimated beam 116. Number of currents 140 then reradiate as electromagnetic signals 144 to form response 134. Response 134 is detected by receiver system 110 in these examples.

In these illustrative examples, receiver system 110 detects fundamental difference frequency signal 146 and number of harmonics of the fundamental difference frequency signal 148 within electromagnetic signals 144 forming response 134.

Difference frequency 142 is selected to be a different frequency from frequency 120 and frequency 122. In this manner, receiver system 110 is sensitive to background noise that may be caused by reflections of collimated beam 114 and collimated beam 116 by object 104, object 106, and/or other objects or materials. Further, collimated beam 114 and collimated beam 116 may be transmitted at higher intensities without worrying about electromagnetic signals 130 and electromagnetic signals 132 coupling into receiver system 110 and possibly blinding and/or saturating receiver system 110.

Number of harmonics of the fundamental difference frequency signal 148 has number of frequencies 152. Number of harmonics of the fundamental difference frequency signal 148 is a harmonic of fundamental difference frequency signal 146. In other words, number of frequencies 152 is a harmonic of frequency 150. Each frequency in number of frequencies 152 is an integer multiple of difference frequency 150.

In these illustrative examples, receiver system 110 may comprise multichannel synchronous detector 154. Multichannel synchronous detector 154 has plurality of channels 155. In these examples, each of plurality of channels 155 may process a band from the multiple bands of frequencies that are formed by fundamental difference frequency signal 146 and number of harmonics of the fundamental difference frequency signal 148.

Each of these channels may be capable of receiving a frequency from frequency 150 and number of frequencies 152. Plurality of channels 155 functions as parallel channels to process different portions of and are used to increase the speed at which response 134 is processed. Of course, in other advantageous embodiments, a single channel may be used to process all of the different frequencies, depending on the particular implementation.

In these examples, processor unit 112 executes program code 156 in number of storage devices 158 to control the operation of transmitter system 108 and receiver system 110. Processor unit 112 may be, for example, a central processing unit, a plurality of processors, a multi-core processor, or some other suitable type of processing system.

Number of storage devices 158 may be, for example, a memory, a persistent storage, a random access memory, a hard disk drive, a solid state disk drive, a thumb drive, a memory stick, or some other suitable type of storage device. Program code 156 is stored on number of storage devices 158 in a functional form for execution by processor unit 112. Program code 156 may be stored on one or more of number of storage devices 158 in these examples.

Program code 156 can be executed by processor unit 112 to control transmitter system 108 to change at least one of frequency 120 and frequency 122 through range of frequencies 160. In the different advantageous embodiments, the frequency ranges used may vary, depending on the particular application. For example, frequencies from around 75 gigahertz to around 110 gigahertz may be used in the different advantageous embodiments. The use of higher or lower frequency bands may be used in different embodiments. Of course, this range may change, depending on the particular application and where the object may be located.

Processor unit 112 is capable of operating receiver system 110 to detect range of fundamental difference frequency signals 174 and range of number of harmonics of the fundamental difference frequency signals 176.

Program code 156 may be executed by processor unit 112 to identify object 104 in addition to detecting a presence of object 104 as part of a detection process. For example, the identification of object 104 may be performed using target profile database 166.

Target profile database 166 contains object signatures. Each profile within profiles 168 contains information needed to determine whether response 134 is for an object within profiles 168. For example, profile 170 is for object 172 and contains range of fundamental difference frequency signals 174 and range of number of harmonics of the fundamental difference frequency signals 176. Profile 170 also may include information derived from the different signals.

Further, range of fundamental difference frequency signals 174 and range of number of harmonics of the fundamental difference frequency signals 176 may be present for number of orientations 178. These different signals may have a different characteristic at different orientations of object 172.

As a result, with number of orientations 178, the likelihood of being able to identify object 104 as object 106 may be increased by increasing number of orientations 178. Further, orientation 180 for object 104 may be identified from response 134 in the different illustrative examples. Three orthogonal orientations of object 172 may be present in number of orientations 178 for object 172. Of course, other numbers of orientations may be used, depending on the particular application.

The different advantageous embodiments take into account that the harmonics may be generated in the reradiated difference frequency signals. Depending on the intensity of collimated beam 114 and collimated beam 116 at location 118, a dozen or more higher harmonics of the fundamental difference frequency signals may be present in number of harmonics of the fundamental difference frequency signal 148.

In these examples, intensity is power density in watts per square meter. With multichannel synchronous detector 154, all of the number of harmonics of the fundamental difference frequency signal 148 in response 134 may be detected simultaneously or substantially at the same time response 134 is received by receiver system 110.

Unique characteristics may be present in fundamental difference frequency signal 146 and number of harmonics of the fundamental difference frequency signal 148 based on number of non-linear electrical characteristics 124 in object 104. The result of the comparison may be used to identify object 104, which is unknown in this illustrative example. These characteristics may be further identified by range 162 of fundamental difference frequency signal 146 and range 164 of number of harmonics of the fundamental difference frequency signal 148 in these illustrative examples.

In the different advantageous embodiments, response 134 is recorded and analyzed in real time. These signals are compared to profiles 168 in target profile database 166. The comparison is used to determine whether object 104 matches a profile in profiles 168 in target profile database 166. The identification may be a particular object in target profile database 166. The identification also may be that the object is not one of the objects within target profile database 166.

In this manner, the different advantageous embodiments provide a capability to not only detect a presence of object 104, but also a possibility of identifying object 104. The different advantageous embodiments also provide a capability to detect the orientation of object 104 in some cases. Further, in some cases, location 118 of object 104 is known, but the identity of object 104 is unknown.

The illustration of detection environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, transmitter system 108 may transmit additional collimated beams in addition to collimated beams 114 and 116 to generate additional responses in addition to response 134. Further, these additional collimated beams may be directed at object 104 or other objects at the same time. As yet another example, in some advantageous embodiments, the processing of response 134 may be performed at a location remote to detection system 102.

In these illustrative examples, detection system 102 may be associated with platform 182. In other words, detection system 102 may be located on, attached to, or otherwise associated with platform 182. Platform 182 may take a number of different forms, depending on the particular implementation. For example, platform 182 may be truck 184, aircraft 186, portable housing 188, and/or some other suitable type of platform. In yet other advantageous embodiments, the range for frequencies may be a single frequency.

FIGS. 2-6 illustrate signals that may be transmitted and detected using the different advantageous embodiments. These illustrations are meant only as examples of one manner in which the different frequencies may be used.

Turning now to FIG. 2, a diagram illustrating locations of a pair of millimeter wave frequencies that may be used to transmit collimated beams is depicted on the direct current to millimeter wave spectral domain in accordance with an advantageous embodiment. Millimeter wave signals have a wavelength from around one centimeter to around one millimeter and have a frequency from around 30 gigahertz to around 300 gigahertz. In this illustrative example, graph 200 illustrates the electromagnetic frequency range from around zero hertz direct current (DC) to around 100 gigahertz.

In the illustrative examples, detection system 102 may generate collimated beam 114 and collimated beam 116 having frequencies around 91 gigahertz at point 202 and at around point 204. These two frequencies have difference 206, which is around one gigahertz in these illustrative examples.

Turning now to FIG. 3, a diagram illustrating a difference frequency and harmonics of the fundamental difference frequency that may be obtained by transmitting a first collimated beam and a second collimated beam at an object is depicted in accordance with an advantageous embodiment. In these examples, the fundamental difference frequency may be around one gigahertz.

The harmonics of the fundamental difference frequency may be, for example, without limitation, two gigahertz, three gigahertz, four gigahertz, five gigahertz, and/or some other suitable integer of the fundamental difference frequency. In graph 300, frequency band 302 contains harmonics of the fundamental difference frequency that may be obtained. The X-axis represents the frequency in gigahertz, while the Y-axis represents the amplitude.

Point 304 represents the fundamental difference frequency created by the difference between frequency 122 and frequency 120 for collimated beam 116 and collimated beam 114 in FIG. 1. Points 306, 308, 310, 312, 314, 316, 318, 320, 322, and 324 represent harmonics of the fundamental difference frequency at point 304.

Figure 4:
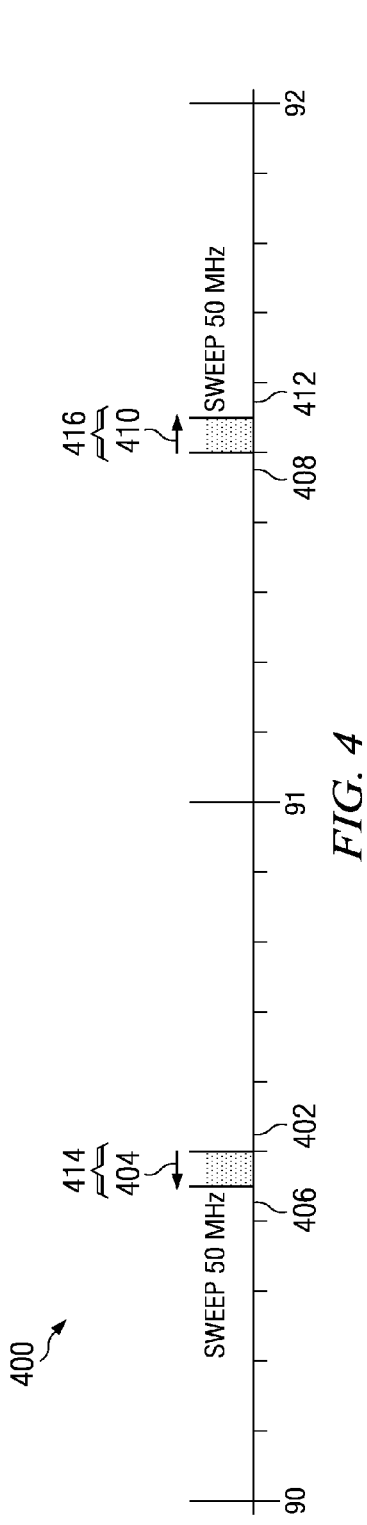
FIG. 4 is a diagram illustrating sweeping of frequencies for a first collimated beam and a second collimated beam through a range of frequencies in accordance with an advantageous embodiment.

Turning now to FIG. 4, a diagram illustrating beams with millimeter wave frequencies that are swept over a range of frequencies for a first collimated beam and a second collimated beam is depicted in accordance with an advantageous embodiment. In these illustrative examples, the frequencies may be swept over a range of frequencies by changing the frequency.

The change, in these examples, may be in a sequential manner in which each frequency is either higher or lower than the previous frequency, depending on the direction. In this depicted example, graph 400 illustrates changing the frequencies for electromagnetic signals within collimated beam 114 and collimated beam 116 in FIG. 1. The X-axis represents frequency in gigahertz, while the Y-axis represents the amplitude of the signal.

In this example for collimated beam 114, the frequency starts at point 402 and moves in the direction of arrow 404 to point 406. For collimated beam 116, the frequency starts at point 408 and is swept in the direction of arrow 410 towards the frequency at point 412. A frequency is swept through a range of frequencies by starting at one end of the range and changing the frequency upwards or downwards to the other end of the range of frequencies.

In this example, the frequency range of sweep in section 414 between point 402 and point 406 is 50 megahertz. In a similar fashion, the frequency range of sweep in section 416 between point 408 and point 412 is 50 megahertz. The composite shifting of the frequencies for these collimated beams results in a total difference frequency range of sweep that is 100 megahertz. In these examples, the frequency range may be a selected amount such as, for example, without limitation, 1 hertz, 10 hertz, 50,000 hertz, 50 megahertz, or some other selected amount.

In the different advantageous embodiments, the width of frequency sweeps selected may be between around 10 percent to around 20 percent of the fundamental difference frequency band used. In other advantageous embodiments, other widths may be selected other than those described above. Accordingly, in this example, section 414 and section 416 provide a 100 megahertz sweep range. Of course, in other advantageous embodiments, only one frequency for one of the collimated beams may be swept or moved through the range of frequencies, while the frequency of the other collimated beam is kept constant.

Also, in other advantageous embodiments, the range of frequencies each collimated beam is made to sweep may be different. The range or magnitude of the frequency sweep selected in this example is such that the response will provide optimized information about identifying a particular object in real life.

Figure 5:
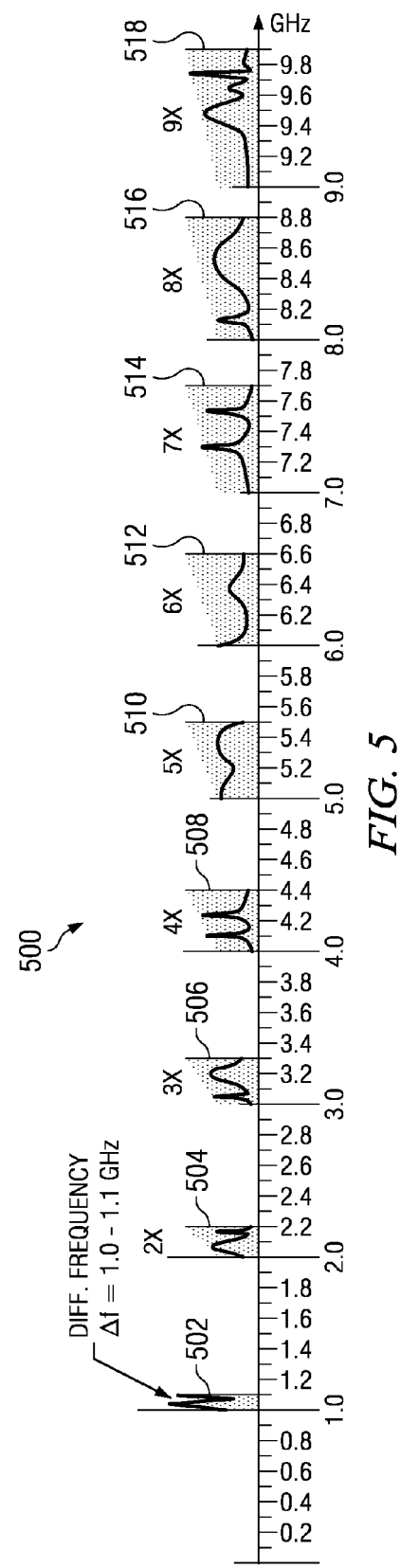
FIG. 5 is a diagram illustrating an example of simultaneous responses detected by a multichannel receiver in accordance with an advantageous embodiment.

Turning now to FIG. 5, a diagram illustrating an example of responses detected by a receiver with parallel synchronous detecting channels is depicted in accordance with an advantageous embodiment. Graph 500 illustrates signals for a fundamental difference frequency, as well as harmonics of the fundamental difference frequency. The X-axis represents frequencies in gigahertz, while the Y-axis represents the amplitude of the signal.

The fundamental frequency is the difference frequency. Response 502 illustrates the response for the fundamental frequency. Responses 504, 506, 508, 510, 512, 514, 516, and 518 are responses of the higher harmonics received in the different channels.

For example, response 504 is the second harmonic, response 506 is the third harmonic, response 508 is the fourth harmonic, response 510 is the fifth harmonic, response 512 is the sixth harmonic, response 514 is the seventh harmonic, response 516 is the eighth harmonic, and response 518 is the ninth harmonic.

Of course, depending on the particular implementation, other numbers of harmonic responses may be detected. For example, in some advantageous embodiments, only one harmonic may be used, while in others, 10, 12, or 15 harmonics could be used. Still, in certain applications, odd harmonics or only the even harmonics may be used, without the even or odd harmonics. All of these responses form a response, such as response 134 in FIG. 1. The shape and characteristics of the different responses are only provided for purposes of illustration and may differ, depending on the particular object from which the responses are obtained.

Figure 6:
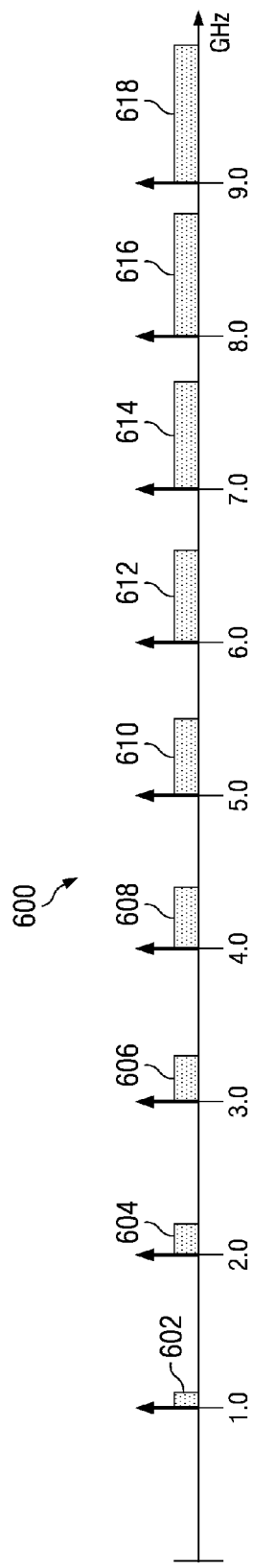
FIG. 6 is a diagram illustrating a series of harmonic outputs from a reference signal generator in accordance with an advantageous embodiment.

Turning now to FIG. 6, a diagram illustrating output from a reference signal generator with rich harmonic content is depicted in accordance with an advantageous embodiment. In these examples, rich harmonic content means that many harmonics are present rather than one or two harmonics. Graph 600 illustrates signals that may be generated from a single difference frequency (Δf) using, for example, harmonic "picket". In other words, the signals may be evenly spaced. In the illustrative examples, the X-axis represents frequency in gigahertz, while the Y-axis represents the amplitude of the signal.

Outputs 602, 604, 606, 608, 610, 612, 614, 616, and 618 are examples of outputs that may be present in the difference frequency and harmonics of the difference frequency in the field reradiated from the illuminated object. In these examples, each output indicates a change in frequency as a range of frequencies, such as range of frequencies 160 in FIG. 1. As can be seen in this example, output 602 is the selected difference frequency. The other outputs are harmonics of the selected difference frequency for the two collimated beams.

Figure 7:
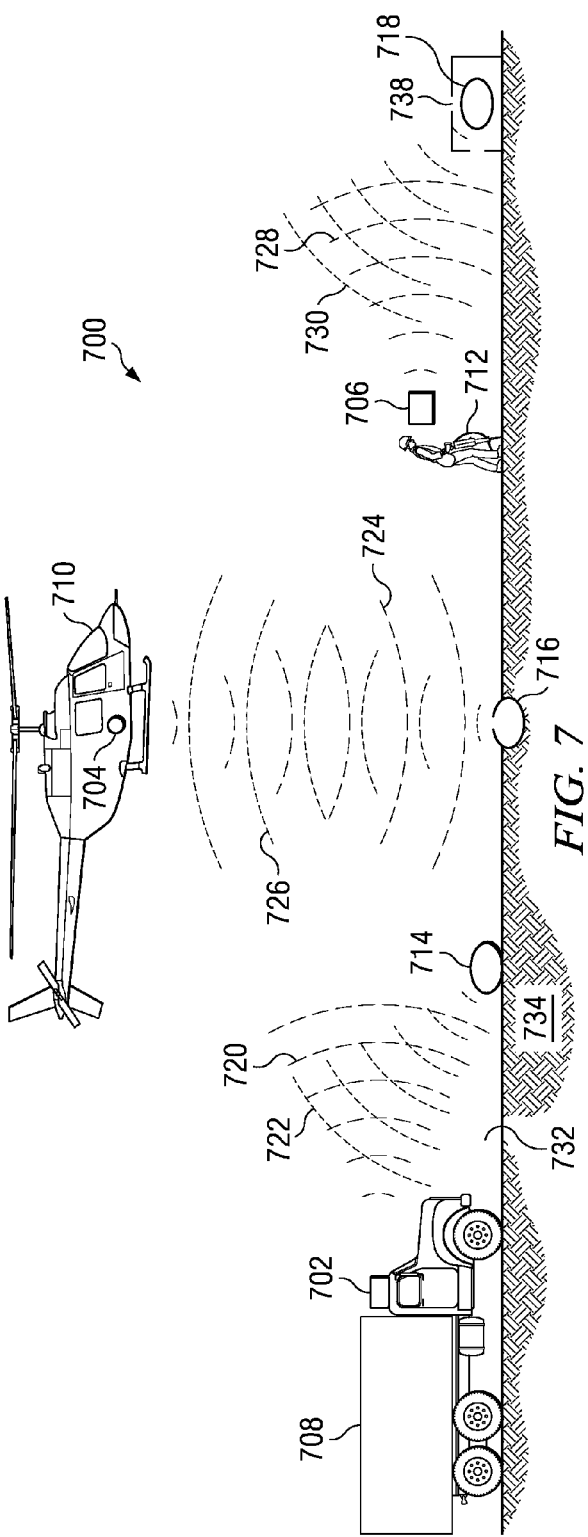
FIG. 7 is a diagram illustrating various detection environments in accordance with an advantageous embodiment.

Turning now to FIG. 7, diagrams illustrating various detection environments are depicted in accordance with an advantageous embodiment. Detection environment 700 is an example of one implementation for detection environment 100 in FIG. 1. In this illustrative example, three detection environments are shown in environment 700 and may include detection systems 702, 704, and 706, which are mounted on platforms in the form of truck 708, helicopter 710, and portable instrument 712.

These detection systems may be used to detect objects, such as objects 714, 716, and 718. Further, these detection systems also may be used to identify the different objects in the detection environments in environment 700. Detection system 702 may generate electromagnetic signals 720 in the form of two collimated beams, which may encounter object 714. In response to object 714 having electrical non-linear characteristics, response 722 is generated and detected by the receiver part of detection system 702.

In a similar fashion, detection system 704 in helicopter 710 generates electromagnetic signals 724 in the form of two collimated beams that overlap at object 716. In these examples, electromagnetic signals 724 may be millimeter wave range signals. If object 716 has electrical non-linear characteristics, response 726 is generated and detected by the receiver part of detection system 704.

Detection system 706 in portable housing 712 also generates electromagnetic signals 728 in the form of two collimated beams. Object 718 generates response 730 if object 718 has electrical non-linear characteristics. Response 730 is detected by the receiver part of detection system 706. These different detection systems also may identify the objects detected. Further, if objects 714, 716, and 718 are visible, detecting locations of the objects may be unnecessary. Instead, the different signals may be used to identify the objects.

In this illustrative example, object 714 may be on surface 732 of ground 734. Object 716 may be under surface 732 of ground 734. Object 718 may be hidden within box 738.

Figure 8:
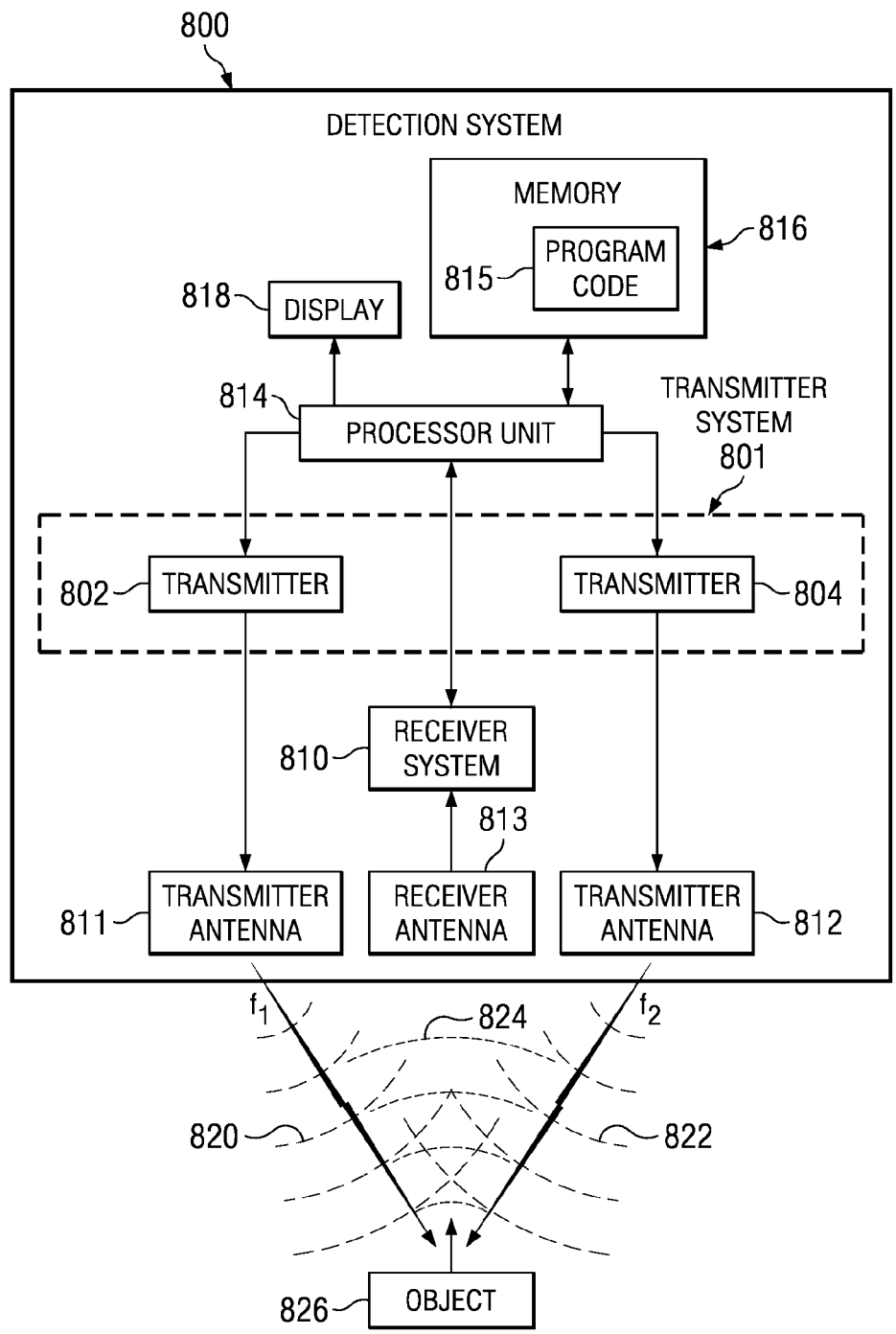
FIG. 8 is a block diagram of a detection system in accordance with an advantageous embodiment.

With reference now to FIG. 8, a block diagram of a detection system is depicted in accordance with an advantageous embodiment. Detection system 800 is an example of one implementation for detection system 102 in FIG. 1. In this illustrative example, detection system 800 is an example of an apparatus that may be implemented in various platforms for use in detecting and/or identifying objects.

In this illustrative example, detection system 800 includes transmitter system 801 with transmitter 802 and transmitter 804 and receiver system 810. Detection system 800 also includes transmitter antenna 811, transmitter antenna 812, and receiver antenna 813. Processor unit 814, memory 816, and display 818 also are located in detection system 800.

Processor unit 814 executes program code 815 stored in memory 816 to control the operation of detection system 800 in these illustrative examples. Of course, in other advantageous embodiments, processor unit 814 may be an application specific integrated circuit (ASIC) that does not need program code to operate detection system 800.

Transmitter antennas 811 and 812 receive electromagnetic energy from transmitters 802 and 804, respectively, and radiate the electromagnetic energy as electromagnetic signals in collimated beams 820 and 822 in these illustrative examples. Depending on the implementation, a single antenna may be used in place of transmitter antennas 811 and 812. Transmitters 802 and 804 may be designed to share a single antenna in this type of implementation. Response signals 824 collected by receiver antenna 813 are routed to receiver system 810. Receiver system 810 filters and/or amplifies response signals 824 for further processing. This processing may include interpretation, storage, and display data for response signals 824.

In these examples, transmitter 802 and transmitter 804 are capable of generating electromagnetic signals emitted as collimated beam 820 and collimated beam 822 having characteristics. These characteristics may include, for example, without limitation, frequency, amplitude, polarization, and/or other suitable attributes.

For example, transmitter 802 may generate electromagnetic signals for collimated beam 820 that are emitted by transmitter antenna 811 with the first frequency f1. Transmitter 804 may generate electromagnetic signals for collimated beam 822 that are emitted by transmitter antenna 812 with the second frequency f2.

The frequencies and amplitudes at which transmitters 802 and 804 generate collimated beams 820 and 822 are controlled by processor unit 814 in these examples. Processor unit 814 acts as a controller to generate collimated beams 820 and 822 in these examples. Information about response signals 824 may be used to help determine the resonant nature (the Q) of objects with non-linear electrical characteristics, which, in turn, may be used to identify the object.

Processor unit 814 may perform these and other operations based on program code 815 stored in memory 816. Characteristics of response signals 824 received by receiver system 810 may be displayed on display 818. Further, display 818 may also provide other information, such as that which may be used to identify object 826, the range or location of object 826, the orientation of object 826, the depth of object 826 in the ground, and/or other suitable information.

Receiver system 810 is designed to detect signals at the difference frequency of the dual beams of the transmitter system and at harmonics of the difference frequency.

Additionally, processor unit 814 also sets receiver system 810 to detect a range of difference frequency signals through which response signals 824 from object 826 are expected. Further, receiver system 810 also may be set to detect harmonics of the difference frequency between frequency f1 and frequency f2.

The difference between the first frequency f1 and the second frequency f2 is equal to a difference frequency that is set for receiver system 810 in these examples. Additionally, receiver system 810 also is set to receive harmonics of the difference frequencies. The frequency selected for transmitters 802 and 804 are such that they do not affect the electronics in receiver system 810. Receiver system 810 is not configured or programmed to detect signals at the frequencies set for transmitters 802 and 804. Receiver system 810 is designed to be sensitive only to the difference frequency and harmonics of the difference frequency in these illustrative examples.

As an example, transmitter 802 may be set to transmit at around 90.5 gigahertz, while transmitter 804 may be set to transmit at around 91.5 gigahertz. The difference between these two frequencies is around 1.0 gigahertz. As an example, transmitter 802 may be set to sweep the frequency from 90.5 gigahertz through a range of frequencies downward by 50 megahertz to around 90.45 gigahertz.

Transmitter 804 may be operated to simultaneously sweep the frequency through a range of frequencies from around 91.5 gigahertz to around 91.55 gigahertz. Receiver system 810 is set to detect signals at around 1 gigahertz to around 1.1 gigahertz.

When electromagnetic signals in collimated beams 820 and 822 reach object 826, currents at the millimeter wave frequencies are induced within conductive and semi-conductive parts of object 826. Some of these induced currents will be rectified and converted to currents with difference frequency $\Delta f$ in portions of the conductive parts of object 826 with non-linear electrical characteristics. These currents with frequency $\Delta f$ will result in the generation of an electromagnetic signal, such as a reradiated electromagnetic field, in the form of response signals 824. Response signals 824 are captured by receiver antenna 813 in these examples.

Receiver system 810 detects response signals 824 and sends this data to processor unit 814 for processing and analysis. In these examples, receiver system 810 does not detect electromagnetic signals reflected from the object and other surfaces at the frequencies of collimated beams 820 and 822 because receiver system 810 is set only to detect a frequency that is the difference between the frequency transmitted by transmitter 802 and the frequency transmitted by transmitter 804 and the harmonic frequencies for this difference frequency.

The non-linear electrical characteristics are found in objects, such as improvised explosive devices. Electrical non-linearities may be present in these objects because of circuits that are present that have electrical non-linearities. These circuits usually include diodes, transistors, and/or other components that have electrical non-linearities. The non-linear electrical characteristics within the object causes a response signal that has a frequency equal to the difference between the two transmitted signals to be returned. This response is detected by receiver system 810 in this example. The response detected by receiver system 810 also includes harmonics for the difference frequency in these illustrative examples.

In these examples, the penetration of electromagnetic fields of collimated beams 820 and 822 in materials increases as the frequencies used decrease. Resolution, however, decreases as well, as the frequencies decrease. More specifically, the spatial resolution decreases. In this illustrative example, transmitter 802 and transmitter 804 may continuously transmit at frequencies f1 and f2. With this type of operation, receiver system 810 detects the frequency that is the difference between these two frequencies along with the harmonics of that frequency.

As a result, response signals 824, when detected by receiver system 810, are processed by processor unit 814 indicating the presence of and/or to identify object 826. Response signals 824 also may be used to identify object 826. Further, with the movement of detection system 800 in a direction relative to object 826, the shape, orientation, and/or distance of object 826 may be identified through continued detection of response signals 824. This information may be stored by processor unit 814 and memory 816 as readings together with location (position) readings as taken by detection system 800.

Response signals 824 may be compared to a database or a library of profiles for objects. This comparison may be performed to identify object 826. Further, depending on the particular implementation, the orientation or positioning of object 826 also may be identified.

Further, processor unit 814 may set receiver system 810 to detect signals within a range of difference frequencies. In this manner, if additional objects in addition to object 826 are located with different electrical non-linear characteristics at various distances, these objects also may be detected and distinguished from one another by detection system 800.

Figure 9:
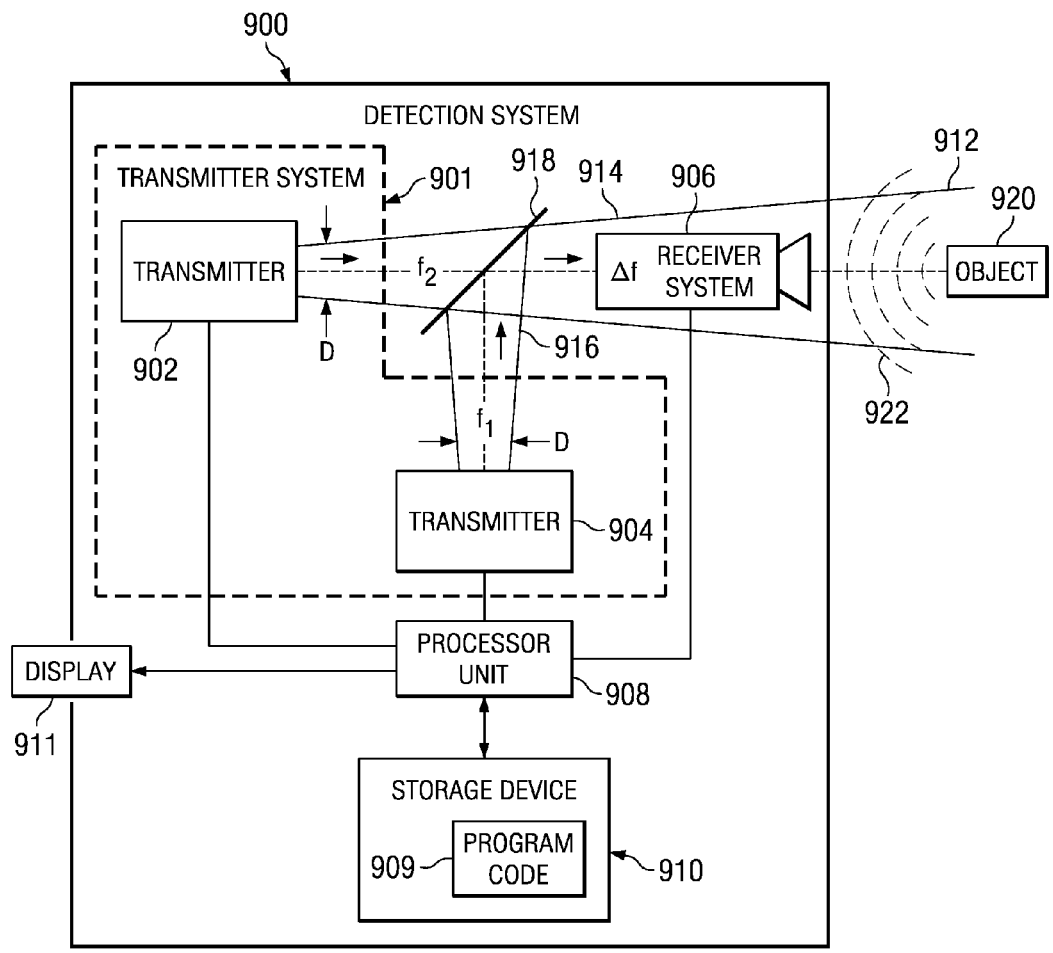
FIG. 9 is a diagram illustrating a detection system in accordance with an advantageous embodiment.

With reference next to FIG. 9, a diagram illustrating a detection system is depicted in accordance with an advantageous embodiment. In this illustrative example, detection system 900 is an example of another implementation of detection system 102 in FIG. 1.

In this particular example, detection system 900 includes transmitter system 901 with transmitter 902, transmitter 904, and receiver system 906. Detection system 900 also includes processor unit 908, storage device 910, and display 911.

Processor unit 908 operates to control transmitter 902 and transmitter 904. Further, processor unit 908 receives data for signals detected by receiver system 906. Processor unit 908 executes program code 909 that may be located in storage device 910. Results of response signals detected by receiver system 906 may be presented on display 911.

In this illustrative example, detection system 900 generates electromagnetic signals in the form of a single beam, beam 912. Beam 912 is generated through a combination of collimated beams 914 and 916, which are generated by transmitter 902 and transmitter 904, respectively. Collimated beams 914 and 916 also may be linearly polarized.

Transmitter 904 generates collimated beam 916 with a first frequency f1. Transmitter 902 generates collimated beam 914 with a second frequency f2. These two beams are combined into beam 912 using beam combiner 918.

In this depicted example, beam 912 is a combined circularly polarized beam with an interference difference frequency. This interference difference frequency is the difference between frequency f1 generated by transmitter 904 and frequency f2 generated by transmitter 902. Beam 912 may be towards object 920, which may be on the surface of the ground, buried in the ground, and/or obscured by another object in these examples. Object 920 has electrical non-linear characteristics that cause currents at the difference frequency to be induced in object 920.

Electromagnetic signals may be emitted from these currents in the form of response signal 922. Object 920 generates response signal 922 with a frequency that is the difference between frequency f1 generated by transmitter 904, and frequency f2 generated by transmitter 902. This frequency is also referred to as a difference frequency or the fundamental frequency. In these illustrative examples, transmitter 902 and transmitter 904 may be controlled by processor unit 908 to transmit collimated beam 914 and collimated beam 916 through a range of frequencies based off of frequency f1 and frequency f2.

Response signal 922 is detected by receiver system 906, which sends the information in response signal 922 to processor unit 908 for processing.

Response signal 922 has a frequency that is a difference between frequency f1 and frequency f2. Further, this difference frequency also changes through a range of frequencies based on the sweeping of frequencies to frequency f1 and frequency f2.

Additionally, receiver system 906 also detects the different harmonics of the difference frequency in response signal 922. Processor unit 908 may store information received in response signal 922 in storage device 910. Additionally, processor unit 908 may display this information in display 911 in detection system 900.

In detection system 900, beam 912 is a directed beam that may be used to search an area that has a radius or diameter for beam 912. As a result, when a signal, such as response signal 922, is received by receiver system 906, a user of detection system 900 is able to identify object 920.

Figure 10:
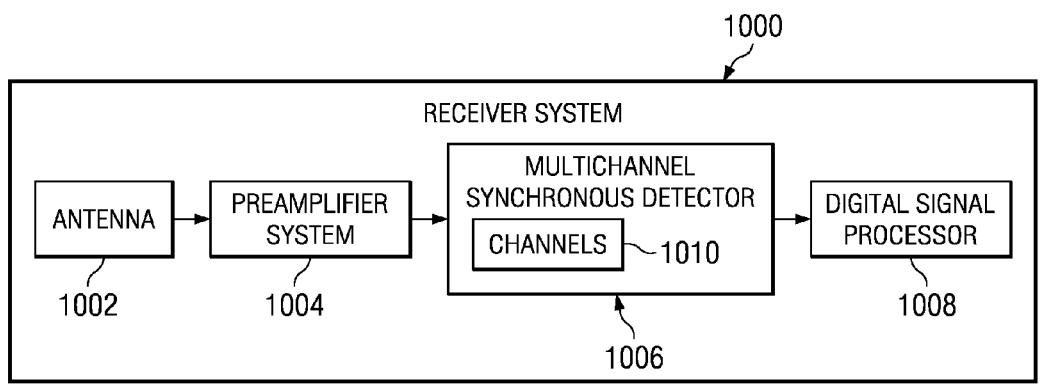
FIG. 10 is a diagram illustrating a receiver system in accordance with an advantageous embodiment.

With reference now to FIG. 10, a diagram illustrating a receiver system is depicted in accordance with an advantageous embodiment. Receiver system 1000 is an example of one implementation of receiver system 110 in FIG. 1.

In this illustrative example, receiver system 1000 includes antenna 1002, preamplifier system 1004, multichannel synchronous detector 1006, and digital signal processor 1008. Antenna 1002 receives response signals generated by collimated beams from the transmitters. Preamplifier system 1004 amplifies signals received by antenna 1002. Multichannel synchronous detector 1006 detects the portion of the signal in the difference frequency.

As described above, the difference frequency is the difference between the frequencies used by the transmitters in the collimated beams. In these illustrative examples, multichannel synchronous detector 1006 contains channels 1010. These channels may each include the components necessary to process a portion of the signal at a selected frequency or range of frequencies. Each portion of the signal may also be referred to as a band. Thus, each channel processes a band, and the receiver can be referred to as a multi-band receiver.

Channels 1010 process frequency bands. In these illustrative examples, these frequencies are the difference frequency and harmonics.

The responses by multichannel synchronous detector 1006 are sent to digital signal processor 1008 for processing. These responses also may be amplified and/or filtered by multichannel synchronous detector 1006. The processed signal may then be used by the processor unit to detect the presence of an object and/or identify the object. Of course, in some advantageous embodiments, digital signal processor 1008 may be part of the processing unit rather than located within receiver system 1000.

Figure 11:
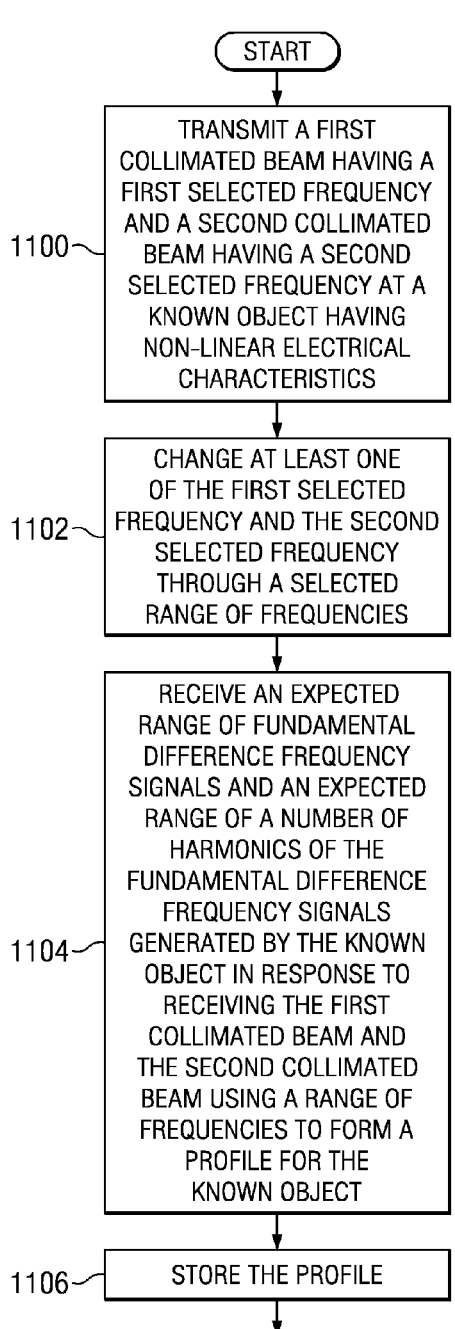
FIG. 11 is a flowchart of a process for creating a profile of an object in accordance with an advantageous embodiment.

With reference next to FIG. 11, a flowchart of a process for creating a profile of an object is depicted in accordance with an advantageous embodiment. The process in FIG. 11 may be implemented in detection environment 100 in FIG. 1 to create profiles used to identify objects.

The process begins by transmitting a first collimated beam having a first selected frequency and a second collimated beam having a second selected frequency at a known object having non-linear electrical characteristics (operation 1100). The process then changes at least one of the first selected frequency and the second selected frequency through a selected range of frequencies (operation 1102). In operation 1102, at least one of the two frequencies may be changed and/or swept through the selected range of frequencies.

The process then receives an expected range of fundamental difference frequency signals and an expected range of a number of harmonics of the fundamental difference frequency signals generated by the known object in response to receiving the first collimated beam and the second collimated beam using a range of frequencies to form a profile for the known object (operation 1104). The profile is stored (operation 1106), with the process terminating thereafter.

The process in FIG. 11 may be performed for any number of objects. Further, this process may be performed in a number of different orientations for the same object. The different orientations allow for more information to be available to more accurately identify an object. Also, this information also may be used to identify the orientation of an unknown object relative to the detector apparatus.

Figure 12:
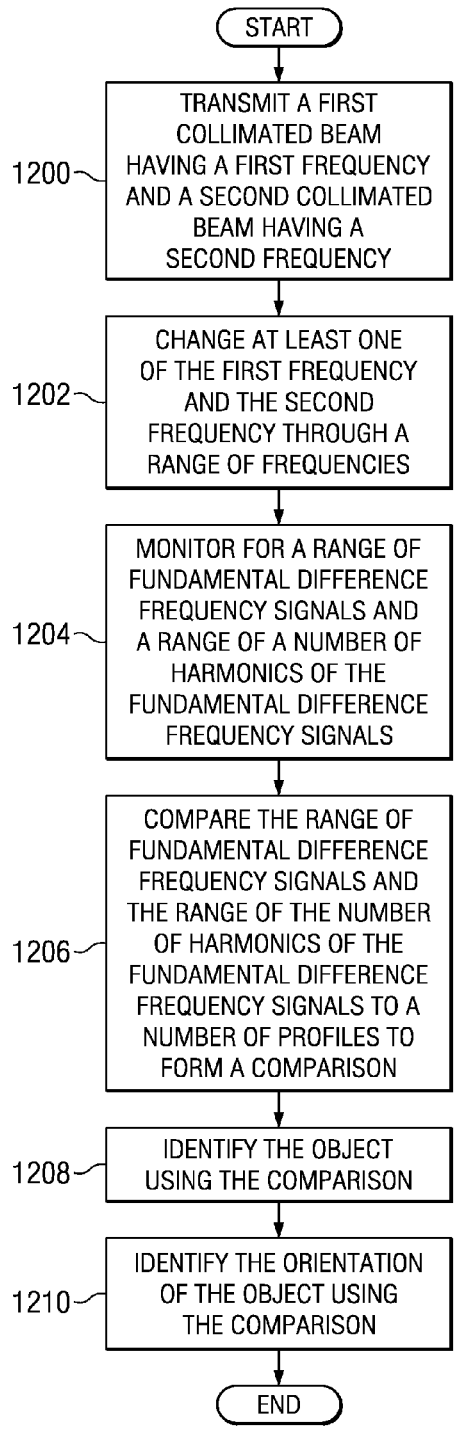
FIG. 12 is a flowchart of a process for detecting objects in accordance with an advantageous embodiment.

With reference now to FIG. 12, a flowchart of a process for detecting objects is depicted in accordance with an advantageous embodiment. The process illustrated in FIG. 12 may be implemented in detection environment 100 in FIG. 1. In particular, the different operations may be performed using detection system 102 in detection environment 100.

The process begins by transmitting a first collimated beam having a first frequency and a second collimated beam having a second frequency (operation 1200). Thereafter, the process changes at least one of the first frequency and the second frequency through a range of frequencies (operation 1202). In operation 1202, the frequency of at least one of the first frequency and the second frequency is changed using the frequencies as identified in the range of frequencies.

In these examples, the frequency starts at one end of the range and moves to the other end of the range in a sweep fashion. Depending on the implementation, both the first frequency and the second frequency may be assigned a portion of the range from which changes to both frequencies are made. In yet other examples, only one of the frequencies is changed using the range.

The process monitors for a range of fundamental difference frequency signals and a range of a number of harmonics of the fundamental difference frequency signals (operation 1204). Each of these radio frequency signals is a harmonic of the range of fundamental difference frequency signals generated by an object having non-linear electrical characteristics in response to receiving the first collimated beam and the second collimated beam using the range of frequencies.

Responsive to detecting the range of fundamental difference frequency signals and the range of the number of harmonics of the fundamental difference frequency signals, the range of fundamental difference frequency signals and the range of the number of harmonics of the fundamental difference frequency signals are compared to a number of profiles to form a comparison (operation 1206). The object is identified using the comparison (operation 1208). The orientation of the object also may be identified using the comparison (operation 1210), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, in some advantageous embodiments, operation 1210 may be omitted. In other advantageous embodiments, operations 1208 and 1210 may be performed in a different order or at the same time.

Thus, the different advantageous embodiments provide a method and apparatus for detecting objects. These objects may be detected using an apparatus comprising a transmitter system, a receiver system, and a processor unit. In the different advantageous embodiments, the transmitter system may transmit electromagnetic signals in the form of two collimated beams having different frequencies.

The response generated when an object having a number of non-linear characteristics is a response having a difference frequency. Further, in addition to the difference frequency, harmonics of the difference frequency also may be identified. These different frequencies, the difference frequency and the harmonics of the difference frequency, will be used to identify the object. Further, the different advantageous embodiments use a range of frequencies to provide information to identify the object.

The description of the different advantageous embodiments has been presented for purposes of illustration and description, and it is not intended to be exhaustive or limited to the embodiments in the form disclosed. Many modifications and variations will be apparent to those of ordinary skill in the art.

All of the different advantageous embodiments have been described with respect to improvised explosive devices, but the different advantageous embodiments may be used to detect any type of object. For example, the different advantageous embodiments may be used to identify improvised nuclear devices, improvised chemical devices, improvised biological devices, improvised incendiary devices, mines, radio transmitters, cell phones, vehicles, computers, and any other object that may have non-linear electrical characteristics that generate responses to collimated beams having different frequencies.

Although the description of the different illustrative embodiments have been with respect to platforms in the form of a truck, an aircraft, and a portable housing, the different advantageous embodiments may be applied to many other types of platforms, depending on the particular implementation.

For example, without limitation, the different advantageous embodiments may be applied to a mobile platform, a stationary platform, a land-based structure, an aquatic-based structure, a space-based structure, a submarine, a bus, a personnel carrier, a tank, a train, an automobile, a spacecraft, a space station, a satellite, a surface ship, and/or some other suitable platform.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a transmitter system capable of transmitting a first collimated beam having a first frequency and a second collimated beam having a second frequency;
a receiver system capable of monitoring for a fundamental difference frequency signal having a difference frequency equal to a difference between the first frequency and the second frequency and a number of harmonics of the fundamental difference frequency signal each of which is a harmonic of the fundamental difference frequency signal, wherein the fundamental difference frequency signal and the number of harmonics of the fundamental difference frequency signal are generated by an object having non-linear electrical characteristics in response to receiving the first collimated beam and the second collimated beam; and
a processor unit connected to the transmitter system and the receiver system, wherein the processor unit is capable of controlling operation of the transmitter system and the receiver system to change at least one of the first frequency and the second frequency through a range of frequencies and to detect a range of fundamental difference frequency signals and a range of the number of harmonics of the fundamental difference frequency signals in response to the transmitter system transmitting the first collimated beam and the second collimated beam using the range of frequencies.

2. The apparatus of claim 1, wherein the range of fundamental difference frequency signals and the range of the number of harmonics of the fundamental difference frequency signals form a pattern, and wherein the processor unit is capable of identifying the object using the pattern.

3. The apparatus of claim 1, wherein the first collimated beam and the second collimated beam are combined into a single beam.

4. The apparatus of claim 2, wherein the processor unit is capable of comparing the pattern to a plurality of patterns of known objects.

5. The apparatus of claim 1, wherein the receiver system comprises a plurality of channels, wherein the plurality of channels is capable of detecting the fundamental difference frequency signal and the number of harmonics of the fundamental difference frequency signal.

6. The apparatus of claim 1, wherein the object is at a location and is selected from one of under a ground, on the ground, in a structure, and on a person.

7. The apparatus of claim 1, wherein the first collimated beam is a first linearly polarized collimated light beam and the second collimated beam is a second linearly polarized collimated light beam.

8. The apparatus of claim 1, wherein the receiver system comprises:
an antenna; and
a multichannel synchronous detector connected to the antenna.

9. The apparatus of claim 8, wherein the multichannel synchronous detector is connected to the antenna by a preamplifier system.

10. The apparatus of claim 1 further comprising:
a platform, wherein the transmitter system, the receiver system, and the processor unit are associated with the platform.

11. The apparatus of claim 10, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a portable housing, and a building.

12. An apparatus comprising:
a transmitter system capable of transmitting a plurality of electromagnetic signals having a first frequency and a second frequency;
a receiver system capable of monitoring for a fundamental difference frequency signal having a difference frequency equal to a difference between the first frequency and the second frequency and a number of harmonics of the fundamental difference frequency signal each of which is a harmonic of the fundamental difference frequency signal, wherein the fundamental difference frequency signal and the number of harmonics of the fundamental difference frequency signal are generated by an object having non-linear electrical characteristics in response to receiving the plurality of electronic signals having the first frequency and the second frequency; and
a processor unit connected to the transmitter system and the receiver system, wherein the processor unit is capable of controlling operation of the transmitter system and the receiver system to change at least one of the first frequency and the second frequency through a range of frequencies and to detect a range of fundamental difference frequency signals and a range of the number of harmonics of the fundamental difference frequency signals in response to the transmitter system transmitting the plurality of electromagnetic signals using the range of frequencies.

13. A method for detecting objects, the method comprising:
transmitting a first collimated beam having a first frequency and a second collimated beam having a second frequency;
changing at least one of the first frequency and the second frequency through a range of frequencies; and
monitoring for a range of fundamental difference frequency signals and a range of a number of harmonics of the fundamental difference frequency signals each of which is a harmonic of the range of fundamental difference frequency signals generated by an object having non-linear electrical characteristics in response to receiving the first collimated beam and the second collimated beam in which at least one of the first frequency and the second frequency is changed through the range of frequencies.

14. The method of claim 13 further comprising:
responsive to detecting the range of fundamental difference frequency signals and the range of the number of harmonics of the fundamental difference frequency signals, comparing the range of fundamental difference frequency signals and the range of the number of harmonics of the fundamental difference frequency signals to a number of profiles to form a comparison.

15. The method of claim 14 further comprising:
identifying the object using the comparison.

16. The method of claim 14 further comprising:
identifying an orientation of the object using the comparison.

17. A method for detecting objects, the method comprising:
transmitting a first collimated beam having a first selected frequency and a second collimated beam having a second selected frequency at a known object having non-linear electrical characteristics;

changing at least one of the first selected frequency and the second selected frequency through a selected range of frequencies;

receiving an expected range of fundamental difference frequency signals and an expected range of a number of harmonics of the fundamental difference frequency signals each of which is a harmonic of the expected range of fundamental difference frequency signals generated by the known object in response to receiving the first collimated beam and the second collimated beam using a range of frequencies to form a profile for the known object; and storing the profile.

18. The method of claim 17 further comprising:

performing the transmitting, changing, receiving, and storing steps for a number of different orientations of the known object.

19. The method of claim 17 further comprising:

transmitting a third collimated beam having the first selected frequency and a fourth collimated beam having the second selected frequency;

changing at least one of the first selected frequency and the second selected frequency through the range of frequencies;

monitoring for a range of fundamental difference frequency signals and a range of a number of harmonics of the fundamental difference frequency signal each of which is a harmonic of the range of fundamental difference frequency signals generated by an object having non-linear electrical characteristics in response to receiving the first collimated beam and the second collimated beam using the range of frequencies; and responsive to detecting the range of fundamental difference frequency signals and the range of the number of harmonics of the fundamental difference frequency signals, comparing the range of fundamental difference frequency signals and the range of the number of harmonics of the fundamental difference frequency signal to a number of profiles to form a comparison.

20. The method of claim 19 further comprising:

identifying the known object from the comparison.

* * * * *